US008162577B2

(12) United States Patent
Moore

(10) Patent No.: US 8,162,577 B2
(45) Date of Patent: Apr. 24, 2012

(54) FASTENER ASSEMBLY

(75) Inventor: John William Moore, Alveston (GB)

(73) Assignee: Airbus UK Limited (GB)

( * ) Notice: Subject to any disclaimer, the term of this patent is extended or adjusted under 35 U.S.C. 154(b) by 440 days.

(21) Appl. No.: 11/252,982

(22) Filed: Oct. 18, 2005

(65) Prior Publication Data

US 2007/0253793 A1 Nov. 1, 2007

(30) Foreign Application Priority Data

Oct. 18, 2004 (GB) .................................. 0423106.4

(51) Int. Cl.
*F16B 13/06* (2006.01)
(52) U.S. Cl. ...................... 411/60.1; 411/57.1; 411/60.2
(58) Field of Classification Search ................. 411/60.1, 411/55, 71–74, 79, 251, 341–343, 941.1, 411/958
See application file for complete search history.

(56) References Cited

U.S. PATENT DOCUMENTS

| 1,619,757 | A | * | 3/1927 | Pelkey | 238/290 |
|---|---|---|---|---|---|
| 1,793,739 | A | * | 2/1931 | Johnston | 411/51 |
| 1,808,318 | A | * | 6/1931 | Pleister | 411/41 |
| 2,392,491 | A | * | 1/1946 | Moran | 411/54 |
| 2,570,618 | A | * | 10/1951 | Werner | 411/60.1 |
| 2,626,023 | A | * | 1/1953 | Lear | 411/60.1 |
| 3,087,473 | A | * | 4/1963 | Thompson et. al. | 123/41.84 |
| 3,306,053 | A | * | 2/1967 | Fulton | 405/215 |
| 3,851,560 | A | * | 12/1974 | Yago | 411/30 |
| 3,908,977 | A | * | 9/1975 | Roepke et al. | 269/287 |
| 3,943,817 | A | * | 3/1976 | Mess | 411/385 |
| 4,194,858 | A | * | 3/1980 | Evans | 405/259.3 |
| 4,315,708 | A | * | 2/1982 | Liebig | 411/65 |
| 4,611,485 | A | * | 9/1986 | Leslie | 73/49.8 |
| 4,613,264 | A | * | 9/1986 | McIntyre et al. | 411/55 |
| 4,714,391 | A | * | 12/1987 | Bergner | 411/54 |
| 4,720,224 | A | * | 1/1988 | Peterken | 411/36 |
| 4,806,053 | A | * | 2/1989 | Herb | 411/32 |
| 4,854,793 | A | * | 8/1989 | Ollivier et al. | 411/49 |
| 4,919,579 | A | * | 4/1990 | Miyanaga | 411/55 |
| 4,940,372 | A | * | 7/1990 | Fischer | 411/32 |
| 4,966,511 | A | * | 10/1990 | Lee | 411/55 |
| 5,052,861 | A | * | 10/1991 | Hipkins, Sr. | 405/259.6 |
| 5,161,916 | A | * | 11/1992 | White et al. | 405/259.6 |
| 5,193,956 | A | * | 3/1993 | Duran | 411/33 |
| 5,219,254 | A | * | 6/1993 | Ball et al. | 411/271 |
| 5,244,101 | A | * | 9/1993 | Palmer et al. | 211/5 |
| 5,458,448 | A | * | 10/1995 | Cheng | 411/55 |
| 5,685,678 | A | * | 11/1997 | Giannuzzi et al. | 411/55 |
| 5,803,686 | A | * | 9/1998 | Erbes et al. | 411/55 |
| 5,980,174 | A | * | 11/1999 | Gallagher et al. | 411/55 |
| 5,993,129 | A | * | 11/1999 | Sato | 411/80.6 |
| 6,238,128 | B1 | * | 5/2001 | Kaibach et al. | 403/297 |
| 6,457,922 | B1 | * | 10/2002 | Tsai | 411/55 |

(Continued)

*Primary Examiner* — Victor Batson
*Assistant Examiner* — Roberta DeLisle
(74) *Attorney, Agent, or Firm* — Patterson Thuente Christensen Pedersen, P.A.

(57) ABSTRACT

The invention relates to a fastener assembly 1 for use as a slave bolt. The fastener assembly can be tightened and released from the same side and comprises:
a) a shank 2 having a bolt head 3 at one end;
b) a sleeve 7 slidably arranged on the shank 2;
c) a spring 6 to bias the sleeve on the shank 2; and
d) an expander stem 9 which can be screwed into a threaded bore 4 which runs the length of shank 2, the stem 9 having an enlarged portion which spreads the fingers 8 of the sleeve so that they engage and clamp the articles to be fastened.

13 Claims, 3 Drawing Sheets

U.S. PATENT DOCUMENTS

| | | |
|---|---|---|
| 6,698,985 B2 | 3/2004 | Gort |
| 6,755,596 B2 * | 6/2004 | Schibi .......................... 405/270 |
| 2002/0054805 A1 * | 5/2002 | Kaibach et al. ............. 411/60.1 |
| 2002/0106256 A1 * | 8/2002 | Kaibach et al. ............. 411/60.1 |
| 2003/0017023 A1 * | 1/2003 | Bisping et al. ............... 411/60.1 |
| 2003/0059271 A1 * | 3/2003 | Chou ........................... 411/54.1 |
| 2003/0063959 A1 * | 4/2003 | Kao ............................. 411/60.2 |

* cited by examiner

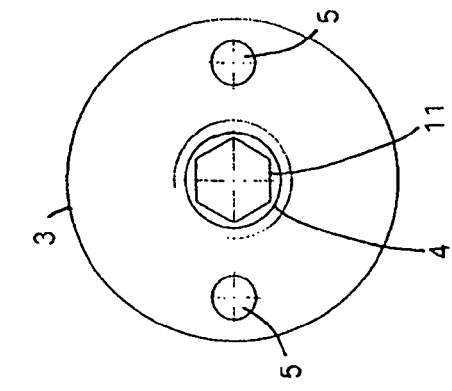
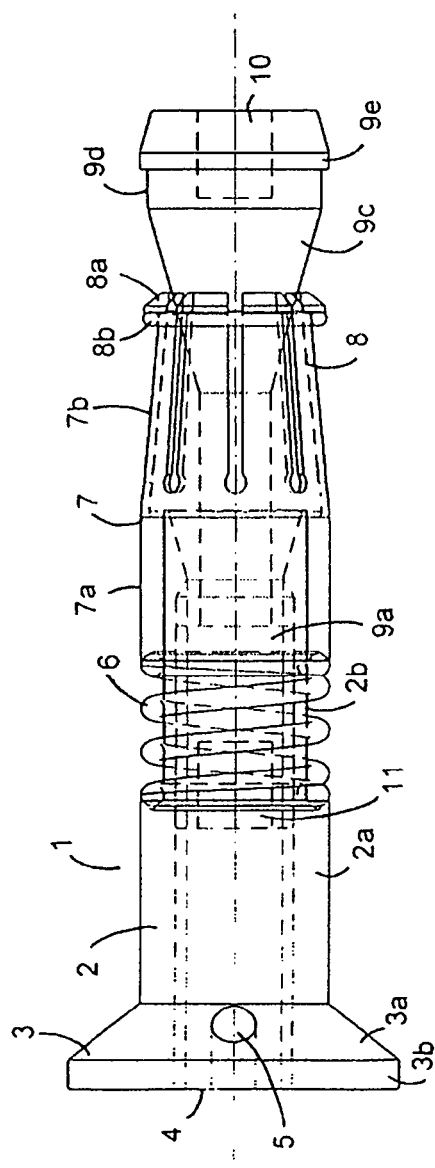
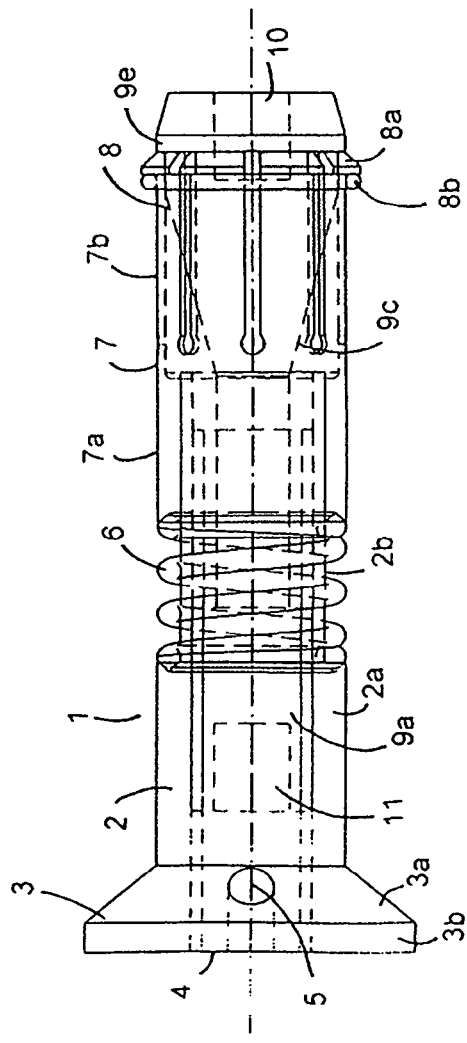

FASTENER ASSEMBLY

The invention relates to a fastener assembly and to a method of fastening together components, for example, aircraft components, using the fastener assembly.

BACKGROUND OF THE INVENTION

In the manufacture of wings for large aircraft, the wing components, including the wing skin panels, the spars, the ribs and other major components are typically partially assembled in a jig which holds those components in the desired alignment whilst holes for fasteners are drilled in predetermined locations by an automated machine. Slave bolts are then inserted in some of the holes to hold the wing assembly together whilst further fastening operations take place.

For manufacture of wings having panels of composite material, the slave bolts currently used to hold the panels to the ribs are simple bolts having a head, which in use is countersunk into the wing panel, a nut and a plastic washer arranged to go between the nut and the rib. That method suffers from the disadvantage that because the bolt head and the nut project from different sides of the panel and must both be engaged simultaneously during tightening of the bolt, in practice the bolts can only be tightened manually, with consequent delay. Furthermore, only one side of the wing skin can be worked on at one time because the space between the upper and lower wing skins is not sufficient for a person to get into to tighten the nuts. Thus, one wing skin must be disassembled before the other wing skin can be aligned with the ribs, drilled and fastened. Thus, the overall process of wing assembly is time consuming and laborious. Moreover, the manual tightening of the slave bolts undesirably brings in an element of human error.

Those problems have been partially overcome in the manufacture of wings having metal panels and metal ribs by the use of slave bolts which can be tightened and released from one side (one-sided). Various designs of such one-sided slave bolts are known but they suffer from the disadvantage that they include bulky mechanisms which, when the bolt is in place, project from the outside (that is, the accessible side) of the wing assembly, thereby preventing access for the head of the previously-mentioned automated machine.

Moreover, some of those known one-sided slave bolts are not suitable for use with composite material components because the part of the bolt which extends through the bolt hole to the inside (that is, the inaccessible side) of the component and clamps against the inside of the component, clamps against only a minor fraction of the periphery of the hole, and would therefore be likely to exert such a pressure as to damage the composite material.

SUMMARY OF THE INVENTION

The invention seeks to mitigate those problems by providing a fastener assembly comprising:

a shank having first and second ends and an at least partially threaded bore extending between the first and second ends, the shank having a bolt head at the first end;

a sleeve slidably arranged on the shank and having, in a region extending beyond the second end of the shank, an expandable portion;

biasing means to bias the sleeve relative to the shank; and an at least partially threaded expander stem partially received within the bore of the shank and projecting from the bore at the second end of the shank, the projecting region of the expander stem having an enlarged portion;

the arrangement being such that, in use, upon screwing the expander stem into the bore of the shank the enlarged portion of the expander stem expands the expandable portion of the sleeve and urges the sleeve along the shank toward the bolt head.

In use, the fastener assembly is inserted into a hole which has been drilled through an assembly of two or more articles to be fastened together, for example, a wing panel and rib. (The invention will be described below in the context of fastening a wing panel to a rib in a wing assembly). For insertion into the hole, the expandable portion of the sleeve is not expanded, the enlarged portion of the expander stem either not abutting that expandable portion or abutting it only lightly. When in position in the hole, the bolt head bears against the outer surface of the wing panel whilst the expandable portion of the sleeve and the enlarged portion of the expander stem project out the other side of the hole. To tighten the fastener assembly, the expander stem is rotated, so as to screw it into the bore of the shank such that the enlarged portion of the stem bears on the expandable portion of the sleeve, causing it to expand. As that expandable portion expands, it enlarges beyond the circumference of the bolt hole. As the expander stem is screwed in further, it carries the sleeve toward the bolt head, thereby bringing the expanded portion of the sleeve into contact with the inside surface of the articles to be fastened. Upon further tightening, the articles to be fastened are clamped between the expanded portion of the sleeve on the inside and the bolt head on the outside. (As used herein "outside" refers to the accessible surface of the wing panel whilst "inside" refers to the rib side, which may be inaccessible.)

When it is desired to remove the fastener assembly, the expander stem is screwed out of the shank, allowing the expanded portion of the sleeve to move away from the surface of the rib and to collapse. The fastener assembly may then be withdrawn from the hole.

The bolt head of the fastener assembly is preferably, in use, countersunk into the surface of the wing panel, so that when the fastener assembly is in place, the bolt head is flush with the surface such that it does not foul automated machinery for hole drilling and other automated operations.

Whilst the bolt head may be of any suitable shape, it is preferably of truncated conical form, for ease of countersinking. Advantageously, the outer surface of the bolt head (that is the surface of the bolt head remote from the shank) is substantially free of projections. The bolt head may include engageable formations, for example, one or more cylindrical sockets, which may be engaged by a tool, in use, to hold the bolt head against the torque applied to the expander stem on tightening and release of the fastener assembly.

The bore extends from one end of the shank to the other and is open at both ends.

Preferably the end of the expander stem received within the bore of the shank also is adapted to be engaged, in use, by a tool inserted into the bore from the first end of the shank. In that way, a tool may be inserted into the bore of the shank from the outside, that is, from the bolt head side, for tightening and releasing the fastener from one side. Using fastener assemblies according to that preferred embodiment, a wing panel may be fastened in a wing assembly using an automated machine which drills the required hole in a predetermined position, inserts the fastener assembly into the hole, tightens the fastener assembly and, when desired, releases the fastener assembly, all of those operations being carried out from the outside of the wing assembly, thereby eliminating the need for the inside of the wing assembly to be accessible, so that there is no need to remove panels from one side of the wing before fastening panels to the other side.

Advantageously, the end of the expander stem received within the bore of the shank includes a socket, into which a tool may engage. Advantageously, the other end of the expander stem, that is, the end which carries the enlarged portion, may also be adapted to be engaged by a tool applied from the inside of the wing assembly. For example, that other end of the expander stem may include a socket. In this way, if for some reason it is not possible to turn the expander stem using a tool inserted through the bolt head end, for example, because a socket at that end is damaged, it will still be possible to release the fastener from the other side, although that may require the wing assembly to be partially dismantled to allow access to the inside of that assembly.

The biasing means biases the sleeve relative to the shank so that, as the expander stem is screwed into the shank, the biasing means resists the movement of the sleeve down the shank toward the bolt head and urges it onto the enlarged portion of the expander stem, thereby promoting the expansion of that expandable portion. The biasing means may be a spring, especially a helical spring. The biasing means is preferably located in the region between the sleeve and the bolt head so that it is compressed as the sleeve is pushed toward the bolt head on tightening of the fastener assembly. Advantageously, the biasing means is also retained in position on the shank and is attached to the sleeve so that, when the expander stem is screwed out of the shank on release of the fastener assembly, the biasing means will resist being extended past its natural length and will act to pull the expanded portion of the sleeve away from the enlarged portion of the stem, thereby promoting collapse of that expanded portion of the sleeve. For example, the biasing means may be a helical spring arranged on the shank in the region between the sleeve and the bolt head and being attached at one end to the sleeve and at the other end to the shank or the bolt head.

In a favoured embodiment, as the expander stem is screwed into the bore, the expandable portion of the sleeve is expanded to a predetermined degree in a first phase and in a second phase the sleeve is moved toward the bolt head. The expandable portion of the sleeve may therefore be expanded to the degree required for engagement with the inside surface of the rib around the hole before it is moved toward the bolt head, thereby ensuring that the expandable portion of the sleeve is not drawn into the bolt hole before being expanded. One way of accomplishing this is to select a biasing means which, as the expander stem is screwed into the shank, exerts a force on the sleeve which is greater than the opposing force required to be exerted by the enlarged portion of the stem on the expandable portion of the sleeve to cause that expandable portion to fully expand, so that the sleeve is held substantially in place while the expandable portion is expanded. When no further expansion of the expandable portion of the sleeve can take place, further screwing of the stem into the shank will overcome the force exerted by the biasing means and the sleeve will therefore move toward the bolt head. Of course, a limited degree of movement of the sleeve along the shank toward the bolt head may occur before the expandable portion is fully expanded, for example, the sleeve may travel up to 20% of its full degree of travel before the expandable portion is fully expanded. Where the biasing means is a helical spring which is compressed as the sleeve travels toward the bolt head, the force required to compress the spring to a small degree say, by 10%, is preferably greater than the force required to fully expand the expandable portion of the sleeve.

The sleeve may be of any suitable design. The sleeve should have an expandable portion which can be expanded to engage the inside surface of the rib around at least a part of the circumference of the hole and that it can move along the shank toward and then away from the bolt head as the wing assembly is fastened together and unfastened. A preferred form of sleeve has a substantially annular portion slidably arranged on the shank and an expandable portion comprising a plurality of fingers arranged circumferentially around and extending from the rim of the annular portion remote from the bolt head, the fingers being biased inwards toward the axis of the annular portion and having outwardly projecting engaging portions.

The degree to which the fingers are biased inwards is not critical but it should be sufficient that the engaging portions on the fingers are held in so that the fastener assembly can be easily inserted and withdrawn from the hole.

Preferably the fingers are integral with the annular portion of the sleeve and the union between the fingers and that annular portion is such that the fingers are disposed to bend inwards toward the axis of the annular portion so that no additional biasing means is required.

The number of fingers is not critical but, for example, may be between 4 and 10.

The fastener assembly may include means for cushioning the force applied by the expanded portion of the sleeve to the surface of the rib around the bolt hole. For example, where the expandable portion comprises a plurality of fingers having outwardly projecting engaging portions, the fastener assembly may include an "O" ring located about the fingers of the expandable portion of the sleeve, adjacent to those engaging portions. The "O" ring may be damaged when the fastener assembly is tightened up and so after use it may be necessary to replace the used "O" ring with a fresh one before the fastener assembly is used again.

Where the articles to be fastened together are of metal or other similarly robust material, it may not be necessary to include any protective element on the expandable portion of the stem.

Advantageously the fastener assembly comprises means, such as a retaining bush, to prevent the sleeve from coming off the shank if the expander stem is removed from the assembly.

The part of the expander stem which screws into the bore of the shank will typically be a fully or partially threaded member of generally circular cross-section adapted to engage with the threads of the bore such that it can without difficulty be screwed the necessary distance into the bore.

The enlarged portion of the expander stem may be of any configuration suitable for expanding the expandable portion of the sleeve. In a preferred embodiment, the expander stem tapers outwardly in the direction away from the bolt head. Especially preferably, the enlarged portion has a circular cross-section and the taper is a conical taper. The expanded portion preferably also has a peripheral lip which, in use, engages with and limits the degree of expansion of the expandable portion of the sleeve. Thus, for example, where the expandable portion of the sleeve includes an annular array of fingers, as mentioned above, the screwing in of the expander stem causes the fingers to ride up along the tapered portion of the stem, causing those fingers to spread, until the ends of the fingers abut the peripheral lip on the enlarged portion of the stem. At that point, the fingers spread no further and further screwing in of the stem into the shank carries the sleeve along the shank. The lip may be provided with an undercut to trap the ends of the fingers, thereby preventing them from spreading further.

A shoulder, that is, a region of constant cross-section in which there is no taper, may be provided along the length of the enlarged portion adjacent the lip on the side closest to the bolt head to support the end regions of the fingers when the fastener assembly is tightened up. Advantageously, the diameter of the enlarged portion of the stem at the shoulder and the thickness of the fingers of the sleeve are matched to the diameter of the drilled hole.

As mentioned above, the sleeve may have an annular portion. Preferably, when the expandable portion of the sleeve is fully expanded, it defines an annulus of the same outer diameter as the annular portions of the sleeve. For example, where the expandable portion of the sleeve comprises a plurality of fingers, when those fingers are fully spread they are advantageously arranged to define an annulus with an outer diameter coincident with that of the annular portion of the sleeve (ignoring engaging portions on the end of the fingers). In that embodiment, when the fastener assembly is in place with the expanded portion of the sleeve expanded, if the diameter of the sleeve is matched to the diameter of the hole the fastener occupies, the fastener will also function as a dowel for locating the wing panel and rib relative to each other.

Preferably, the shank is of circular cross-section and has a region of larger diameter in the vicinity of the bolt head, the circumference of which is also coincident with the circumference of the annular portion of the sleeve, and a region of smaller diameter remote from the bolt head upon which the sleeve is arranged. In that embodiment, the outer surfaces of the larger diameter region of the shank, the annular portion of the sleeve and the expanded portion of the sleeve all preferably define a cylindrical surface such that the fastener acts as a dowel when located in a drilled hole of corresponding diameter.

The invention also provides a method of fastening in which articles to be fastened together are held in the desired alignment, a hole is drilled through the articles, a fastener assembly according to the invention is inserted into the hole, and the expander stem is screwed into the bore using a tool inserted into the bore at the first end of the shank, thereby causing the expandable portion of the sleeve to expand and the sleeve to be urged toward the bolt head to clamp the articles to be fastened between the bolt head and the expanded portion of the sleeve. Preferably the bolt head is countersunk into the hole, such that it lies substantially flush with the surface. The method is particularly applicable to the temporary fastening together of aircraft components, in particular wing components such as a wing panel and rib assembly, especially a wing panel and rib assembly of composite material. Advantageously, the fastener assembly is inserted, tightened up, loosened and removed from one side only. Advantageously, the hole is drilled, the fastener assembly is inserted into the hole and tightened up by an automated machine as part of the same operation. Advantageously, the fastener assembly is re-usable.

Whilst the use of the fastener assembly of the invention has been described above in relation to the fastening of aircraft components, such as a wing panel to a wing rib, the fastener assembly may also, of course, be used to fasten together any assembly of articles through which a suitable hole has been formed, for example, automotive and marine components.

DESCRIPTION OF THE FIGURES

One embodiment of the invention will now be described for the purpose of illustration only with reference to the drawings in which:

FIG. 1 shows a side view of a fastener assembly according to the invention in unexpanded condition;

FIG. 2 shows a side view of the fastener assembly of FIG. 1 in expanded condition;

FIG. 3 shows an end view of the bolt head of the fastener assembly of FIGS. 1 and 2;

DETAILED DESCRIPTION

Figure 4:
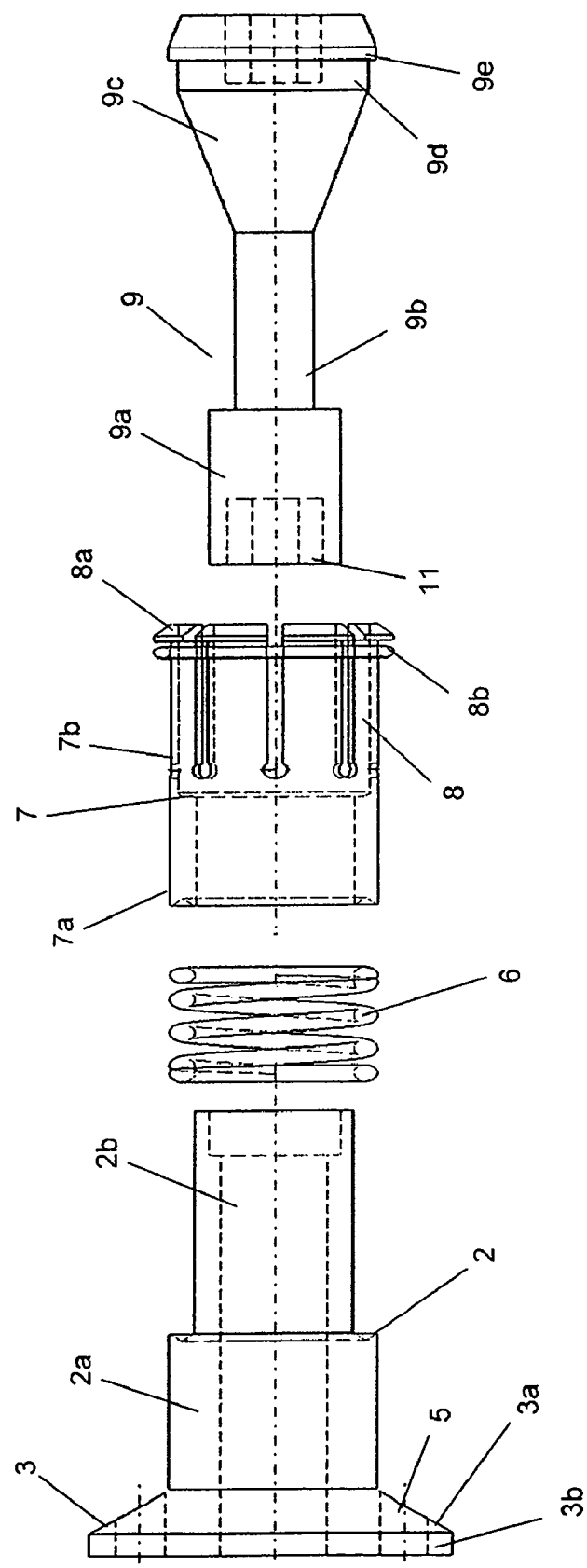
FIG. 4 shows a perspective, exploded view of the fastener assembly of FIGS. 1 to 3.

FIGS. 1 to 4 show a fastener assembly 1 comprising generally cylindrical shank 2 having at one end a bolt head 3. The bolt head comprises a conical section 3a which tapers outwardly away from the shank and a cylindrical section 3b. The bolt head 3 is formed as one piece with the shank 2, is of circular cross-section and is coaxial with the shank 2.

A central bore 4 extends the length of shank 2 and is open both at the bolt head end and at the other end of shank 2. The bore 4 is circular in cross-section, is coaxial with the shank 2 and bolt head 3 and is internally threaded. At the end remote from the bolt head, the bore 4 tapers outward slightly. Arranged in the bolt head 3 on either side of the bore 4 are two cylindrical holes 5 through the bolt head.

The shank 2 has a region 2a of larger diameter adjacent to the bolt head 3 and a region of 2b of slightly smaller diameter around which is located a helical spring 6. The shoulder formed at the union of the region 2a of larger diameter and the region 2b of smaller diameter of the shank 2 is formed with a circular groove into which one end of the helical spring 6 seats. The natural length of the helical spring 6 is such that it extends over approximately half of the length of the region 2b of smaller diameter of the shank 2. Arranged on the other half of that region 2b is a sleeve 7 which comprises an annular portion 7a, which is adjacent to the helical spring 6, and an expandable portion 7b. The expandable portion 7b comprises six fingers 8 which extend from the end of the annular portion 7a in a direction away from helical spring 6. In FIG. 1 those fingers 8 are shown in their relaxed configuration, that is, sloping slightly inwards towards the axis of the fastener assembly. Each finger 8 has at its end an outwardly projecting engaging member 8a. Located around the ends of the six fingers 8, adjacent to the engaging portions 8a, is "O" ring 8b. The degree of slope of the fingers 8 is such that, in the relaxed position of the fingers as shown in FIG. 1, the outermost portions of the engaging members 8a and the "O" ring 8b do not extend outwardly more than the diameter of the annular section 7a of the sleeve 7. Sleeve 7 can slide length ways along the section 7b of reduced diameter of shank 2.

The length of the annular section 7a of the sleeve 7 is approximately equal to the length of the shank which projects beyond the spring 6 so that when the spring is at its natural, (relaxed) length and one end of the annular part 7a of sleeve 7 abuts the spring 6, the other end of that annular section 7a is at or just beyond the end of the shank 2, with the fingers 8 extending beyond the shank.

Received within the bore 4 is expander stem 9 having a threaded portion 9a (threads are not shown in the Figures) which, as shown in FIGS. 1 and 2 is located within the threaded bore 4. Extending from the threaded portion 9a is a narrower cylindrical section 9b which as shown in FIGS. 1 and 2 projects out of the bore 4 and has at its other end an enlarged portion comprising a tapered section 9c which tapers conically outwardly away from cylindrical section 9b to a region of constant diameter which forms a shoulder 9d. Set on the shoulder 9d is a lip 9e which extends around the circumference of the shoulder part of the enlarged portion of expander stem 9. The expander stem 9 extends beyond lip 9e a short distance and has a flat end face into which is sunk hexagonal socket 10.

The threaded portion 9a of the expander stem 9 is provided at its end with hexagonal socket 11 which is accessible through the bolt end head of bore 4.

In use, the fastener assembly 1 is initially in the condition shown in FIG. 1, with the ends of fingers 8 lightly touching the surface of tapered section 9c of the expander stem 9. In this condition, the fastener assembly 1 is inserted into a hole drilled, for example, through a wing panel and rib assembly. The hole is countersunk so that the bolt head 3 fits substantially flush with the surface of the panel. The hole is of only slightly larger diameter, say 10 μm larger, than the diameter of the widest part 7a of the sleeve 7 and of the shank 2. The length of the fastener assembly is chosen such that the expandable portion 7b of the sleeve 7 projects at least partially from the other end of the hole.

An automated machine tool then inserts cylindrical pins in sockets 5 of bolt head 3 to hold the bolt head 3 and shank 2 against rotation, while a hexagonal bit is inserted through the bore 4 into socket 11 in the end of the expander stem. The tool drive is then activated to screw the expander stem 9 into the bore 4 of shank 2. As the stem 9 screws into the bore 4, the tapered portion 9c of the stem 9 moves toward the bolt head end of the assembly thereby spreading fingers 8. During this stage, the force applied to the sleeve 7 by the enlarged portion of the expander stem 9 may cause slight compression of spring 6. When fingers 8 slide onto shoulder 9d, the fingers 8 are fully expanded and define an annulus having an outer circumference coincident with the outer circumference of the annular part 7a of the sleeve 7 and with the region 2a of larger diameter of shank 2, with the engaging portion of fingers 8 extending outwardly in a circumferential ring. In this condition, the fastener assembly serves as a dowel to bring the holes in the wing panel and rib into close alignment.

As the expender stem 9 is screwed further into bore 4, the ends of fingers 8 travel along the shoulder region 9d of the expander stem until they abut the circumferential lip 9e. At that point, the fastener assembly is in the condition shown in FIG. 2. Upon further screwing of the expander stem 9 into the bore 4, the lip 9e bears on the ends of fingers 8 and the sleeve 7 is driven down the shank 2 in the direction of bolt head 3, compressing helical spring 6 and bringing the "O" ring 8b into contact with the inside rim of the drilled hole. Further screwing in of the expander stem 9 compresses the "O" ring between the rim of the hole and the engaging portions 9, thereby clamping together the wing panel and rib. As will be appreciated, the clamping force is applied by the engaging portions 8a substantially evenly around the whole of the rim of the hole. In the tightened condition, the end regions of the fingers 8 fit snugly between and are supported by the inner surface of the hole and the surface of the shoulder 9d of the stem 9.

To release the fastener assembly 1, the tool is re-introduced into the bolt head sockets 5 and into the hexagonal expander stem socket 11 and the stem 9 is unscrewed from the bore 4, thereby releasing the clamping force. As the expander stem 9 is unscrewed further, the fingers 8 travel back down the tapered portion 9c of the enlarged portion of the expander stem 9 and contract inwards, allowing the fastener assembly to be drawn from the hole. If for any reason, the bolt head sockets 5 or expander stem socket 11 have become damaged so that the tool cannot engage, the expander stem 9 may be driven from the other side by insertion of a tool into socket 10.

Figure 5:
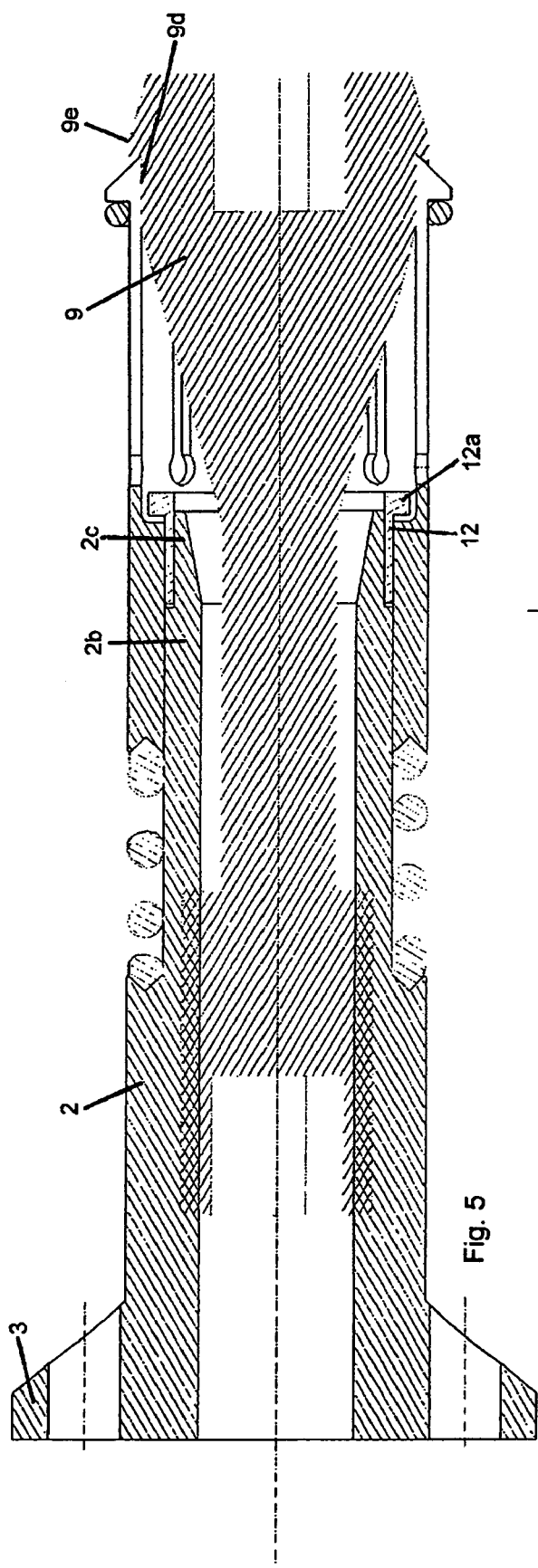
FIG. 5 shows a cross-section through another fastener assembly according to the invention.

FIG. 5 shows another fastener assembly according to the invention which is generally similar to that shown in FIGS. 1 to 4 but which includes two modifications.

Figure 6B:
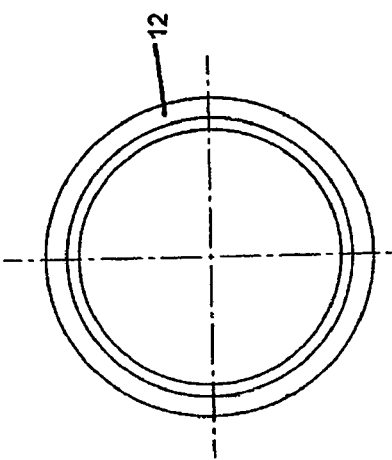
FIGS. 6a and b show views from the side and end, respectively, of a retaining bush present in the assembly of FIG. 5.
Figure 6A:
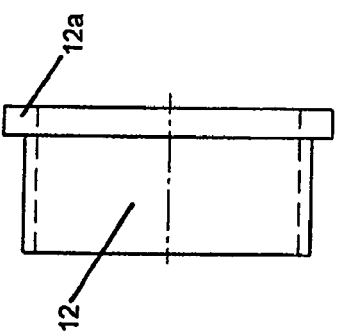

The shank 2 (when appropriate the reference numbers used in relation to FIGS. 1 to 4 relate to corresponding features in the assembly of FIG. 5) has at its remote end a region 2c of further reduced diameter upon which is held a generally annular retaining bush 12. The bush 12 is made of steel and is a press fit on the shank 2. It is therefore retained around the region 2c of the shank 2 by friction. The bush (shown in FIGS. 6a and b), has, at the end remote from bolt head 3, an expanded portion 12a. That expanded portion has an outer diameter greater than the inner diameter of the sleeve 7, and stops the sleeve 7 from sliding off the shank 2 when the expander stem 9 is unscrewed from the assembly.

As can be seen from FIG. 5, the lip 9e of the expander stem 9 is formed with an undercut where it meets with shoulder 9d. As the expander stem 9 is screwed into the shank 2, that undercut traps the ends of the fingers 8, preventing them from spreading out over the lip 9e.

While the present invention has been described and illustrated by reference to a particular embodiment it will be appreciated by those of ordinary skill in the art that the invention lends itself to many different variations not illustrated herein. For those reasons, reference should be made to the claims for purposes of determining the true scope of the present invention.

The invention claimed is:

1. A fastener assembly for fastening a plurality of articles together comprising:
   a shank having first and second ends, the first end having a bolt head and an at least partially threaded through bore extending between the bolt head and second end;
   a sleeve slidably arranged about the shank and having, in a region extending beyond the second end of the shank, an expandable portion,
   wherein the shank is a circular cross-section and has a region of larger diameter in the vicinity of the bolt head, and a region of smaller diameter remote from the bolt head upon which the sleeve is arranged, the sleeve being coaxial with and of the same outer diameter as the region of larger diameter of the shank;
   biasing means to bias the sleeve relative to the shank; and
   an at least partially threaded expander stem partially received within the bore of the shank and projecting from the bore at the second end of the shank, the projecting region of the expander stem having an enlarged portion;
   wherein when the expander stem is advanced into the bore of the shank, the enlarged portion of the expander stem expands the expandable portion of the sleeve and urges the sleeve against the bias of the biasing means along the shank toward the bolt head,
   so that articles to be fastened are clamped between the expanded portion of the sleeve and the bolt head and,
   wherein the expander stem is screwed out of the shank upon removal of the fastener assembly, so allowing the expanded portion of the sleeve to move and to collapse, thereby allowing the fastener assembly to be removed.

2. A fastener assembly as claimed in claim 1 in which the end of the expander stem received within the bore of the shank is adapted to be engaged, in use, by a tool inserted into the bore from the first end of the shank.

3. A fastener assembly as claimed in claim 2 in which the enlarged portion of the expander stem is also adapted to be engaged, in use, by a tool.

4. A fastener assembly as claimed in claim 1 in which the opposing ends of the expander stem define a socket adapted to be engaged, in use, by a tool.

5. A fastener assembly as claimed in claim 1 in which the sleeve has a substantially annular portion slidably arranged on the shank and wherein when the expander stem is advanced into the bore of the shank, the expandable portion of the sleeve is expanded to a diameter coincident to that of the annular portion of the sleeve.

6. A fastener assembly as claimed in claim 1 in which said expandable portion includes at least one engagement projection disposed towards the end of the expandable portion.

7. A fastener assembly for fastening a plurality of articles together comprising:
- a shank having first and second ends, the first end having a bolt head and an at least partially threaded through bore extending between the bolt head and second end;
- a sleeve slidably arranged about the shank and having, in a region extending beyond the second end of the shank, an expandable portion;
- wherein the sleeve has a substantially annular portion slidably arranged on the shank and an expandable portion comprising a plurality of fingers arranged circumferentially around and extending from the rim of the annular portion remote from the bolt head, the fingers being biased inwards toward the axis of the annular portion and having outwardly projecting engagement projections,
- and wherein the fastener includes an "O" ring located about the fingers of the expandable portion of the sleeve, adjacent to the engagement projections of the fingers,
- biasing means to bias the sleeve relative to the shank; and
- an at least partially threaded expander stem partially received within the bore of the shank and projecting from the bore at the second end of the shank, the projecting region of the expander stem having an enlarged portion;
- wherein when the expander stem is advanced into the bore of the shank, the enlarged portion of the expander stem expands the expandable portion of the sleeve and urges the sleeve against the bias of the biasing means along the shank toward the bolt head,
- so that articles to be fastened are clamped between the expanded portion of the sleeve and the bolt head and,
- wherein the expander stem is screwed out of the shank upon removal of the fastener assembly, so allowing the expanded portion of the sleeve to move and to collapse, thereby allowing the fastener assembly to be removed.

8. A fastener assembly as claimed in claim 1 or claim 7 in which the arrangement is such that, as the expander stem is screwed into the bore in use, the expandable portion of the sleeve is expanded to a predetermined degree in a first phase and in a second phase the sleeve is moved toward the bolt head.

9. A fastener assembly as claimed in claim 1 or claim 7 in which the enlarged portion of the expander stem tapers outwardly in the direction away from the bolt head and has a peripheral lip which, in use, engages with and limits the degree of expansion of the expandable portion of the sleeve.

10. A fastener assembly as claimed in claim 9 in which the enlarged portion of the expander stem has a shoulder adjacent to the lip.

11. A fastener assembly as claimed in claim 9 in which the sleeve is annular and, at the limiting degree of expansion, the expandable portion of the sleeve defines an annulus of the same outer diameter as the annular portion of the sleeve.

12. A fastener assembly for fastening a plurality of articles together comprising:
- a shank having first and second ends, the first end having a bolt head and an at least partially threaded through bore extending between the bolt head and second end;
- a sleeve slidably arranged about the shank and having, in a region extending beyond the second end of the shank, an expandable portion, said expandable portion;
- wherein the shank bolt head is cylindrical and wherein the shank includes a conical section that tapers inwardly from the cylindrical head,
- biasing means to bias the sleeve relative to the shank; and
- an at least partially threaded expander stem partially received within the bore of the shank and projecting from the bore at the second end of the shank, the projecting region of the expander stem having an enlarged portion;
- wherein when the expander stem is advanced into the bore of the shank, the enlarged portion of the expander stem expands the expandable portion of the sleeve and urges the sleeve against the bias of the biasing means along the shank toward the bolt head,
- so that articles to be fastened are clamped between the expanded portion of the sleeve and the bolt head and,
- wherein the expander stem is screwed out of the shank upon removal of the fastener assembly, so allowing the expanded portion of the sleeve to move and to collapse, thereby allowing the fastener assembly to be removed.

13. A fastener assembly for fastening a plurality of articles together comprising:
- a shank having first and second ends, the first end having a bolt head and an at least partially threaded through bore extending between the bolt head and second end;
- a sleeve slidably arranged about the shank and having, in a region extending beyond the second end of the shank, an expandable portion;
- wherein the bolt head includes at least one socket for inserting a restraining pin,
- biasing means to bias the sleeve relative to the shank; and
- an at least partially threaded expander stem partially received within the bore of the shank and projecting from the bore at the second end of the shank, the projecting region of the expander stem having an enlarged portion;
- wherein when the expander stem is advanced into the bore of the shank, the enlarged portion of the expander stem expands the expandable portion of the sleeve and urges the sleeve against the bias of the biasing means along the shank toward the bolt head,
- so that articles to be fastened are clamped between the expanded portion of the sleeve and the bolt head and,
- wherein the expander stem is screwed out of the shank upon removal of the fastener assembly, so allowing the expanded portion of the sleeve to move and to collapse, thereby allowing the fastener assembly to be removed.

\* \* \* \* \*